United States Patent

[11] 3,598,500

| [72] | Inventor | Carl J. Oxford, Jr.<br>Rochester, Mich. |
|---|---|---|
| [21] | Appl. No. | 813,859 |
| [22] | Filed | Apr. 7, 1969 |
| [45] | Patented | Aug. 10, 1971 |
| [73] | Assignee | National Twist Drill & Tool Co.<br>Rochester, Mich. |

[54] TWIST DRILL
4 Claims, 3 Drawing Figs.

[52] U.S. Cl. ................................................. 408/210,
145/117, 408/186
[51] Int. Cl. ....................................................... B23b 51/02
[50] Field of Search ............................................. 77/70, 60,
67, 65; 145/117; 279/1 S

[56] References Cited
UNITED STATES PATENTS

| 2,389,909 | 11/1945 | Hofbauer ...................... | 77/65 |
| 2,778,651 | 1/1957 | Benjamin et al. ............. | 279/47 |
| 3,052,999 | 9/1962 | Sedgwick et al. ............. | 40/2.2 |

Primary Examiner—Francis S. Husar
Attorney—Whittemore, Hulbert & Belknap

ABSTRACT: Numerical control drill system employing stubbing collet, and a double-margin drill for improving support and rotational accuracy by the collet, that portion of the drill extending beyond the collet having the trailing margin removed.

PATENTED AUG 10 1971 3,598,500

INVENTOR.
CARL J. OXFORD, JR
BY Whittemore
Hulbert & Belknap
ATTORNEYS

TWIST DRILL

BRIEF SUMMARY OF THE INVENTION

In numerical-controlled machine tools including drills it is desirable to insert the shank end of the drill through a stubbing collet into engagement with a stop which determines the depth to which the particular drill will penetrate the work in the drilling operation, after which the collet is contracted. Both hole accuracy and drill life are generally improved if the shortest possible drill extension is used.

In accordance with the present invention the drill, which is usually longer than necessary for many operations when new, is a double-margin drill having two margins on each land. This provides for a multiplicity of substantially equally spaced margin areas adapted to be gripped by the collet and hence provides for improved drill support. However, the portion of the drill which enters the work and forms the hole performs better if the trailing margins are omitted.

Therefore, the present invention includes as a procedural step the removal of the trailing margins on the active portion of the drill which extends forwardly of the stubbing collet. As the drill is resharpened, and hence shortened and set forwardly so as to continue drilling to the required depth, the trailing margin is removed from the portion of the drill which is caused to extend beyond the stubbing collet.

DETAILED DESCRIPTION

Figure 1:
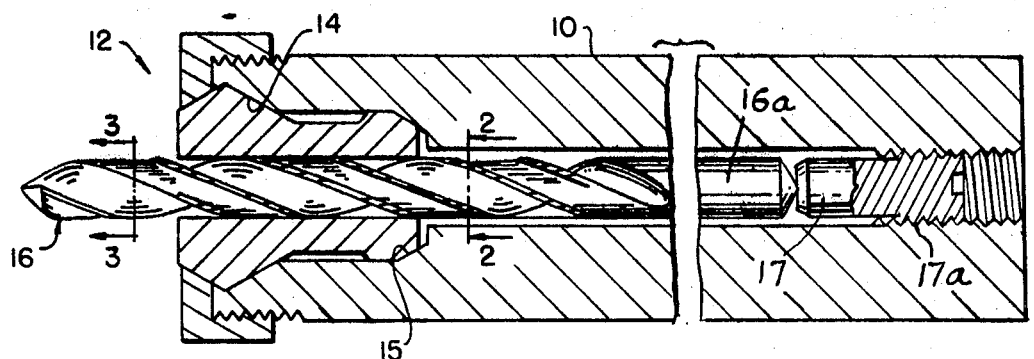
FIG. 1 is a longitudinal section through a drill holder and drill.

In FIG. 1 there is illustrated a spindle 10 which forms a part of the spindle nose or tool holder of a machine tool adapted for numerical control. It will be appreciated that in some machines several stations may be provided with a multiplicity of drills which are simultaneously actuated to perform a like number of drilling operations simultaneously. Located at the forward end of the spindle 10 there is diagrammatically indicated a stubbing collet 12 which may for example be a collet provided with longitudinally extending slots, alternate ones of which extend from opposite ends of the collet. When the collet is contracted as for example by being formed inwardly of conical openings 14, 15 in the arbor, tool holder, or spindle, the collet closes in substantially uniformly and is adapted to grip a generally cylindrical body circumferentially.

Figure 2:
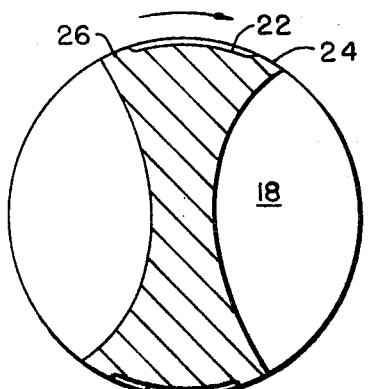
FIGS. 2 and 3 are enlarged transverse sectional views of the drill used in the present invention, taken on the lines 2—2 and 3—3 respectively.

Located in the arbor and collet is a drill 16 having a relatively short cylindrical shank 16a, the inner end of which engages a longitudinally adjustable stop 17 which determines the amounts of extension of the forward end of the drill beyond the forward end of the collet. The drill stop 17 may for example have a threaded portion at its rear end engaged in a threaded opening at the rear of the spindle as indicated at 17a. The drill 16 is illustrated as a two-fluted twist drill, the transverse section of which is seen in enlarged scale in FIGS. 2 and 3. The flutes extend throughout the major portion of the drill. In FIG. 2 it will be observed that intermediate the flutes 18 the land areas indicated generally at 20 are centrally radially relieved as indicated at 22 to provide a double margin comprising a leading margin 24 and a trailing margin 26. The actual margins are substantially but not exactly cylindrical but are given a very slight axial diametral relief as for example, 0.0001 to 0.0005 inches per inch of length.

Figure 3:
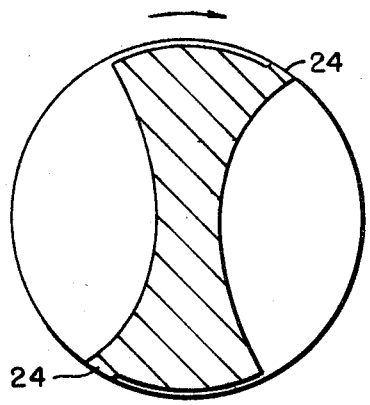

The drill 16 is a straight-web double-margin drill throughout its fluted portion and in use is modified as aforesaid by leaving the leading margin 24, but removing the trailing margin 26 from the active portion of the drill. A new drill might be manufactured with the trailing margin removed for a short distance, say three diameters. This is best seen in FIG. 3 where in the active portion of the drill, only the leading margin is retained.

In practice the drill is normally extended forwardly from the collet by an amount approximately equal to the hole depth plus the clearance necessary for free chip ejection. Throughout this portion the trailing margin is removed to eliminate drag problems. As the drill is resharpened or extended for drilling deeper holes, the trailing margin is removed from the active portion. This has a negligible effect on drill rigidity but substantially improves drill operation. On the other hand, the presence of the trailing margin in the portion of the drill which is gripped by the collet materially improves alignment and support of the drill and reduces runout because of the more complete diameter contact afforded by the double margin.

The straight-web construction simplifies resharpening by eliminating the necessity for thinning. However, it will be understood that the present invention is also applicable to heavy web or tapered web drills.

What I claim as my invention is:

1. The method of using a double-margin drill in a machine tool adapted to numerical control, the machine tool having a contractable collet adapted to grip an intermediate portion of the drill which comprises providing a double-margin drill each land of which has circumferentially spaced leading and trailing margins, removing the portion of the trailing margins from the active portion of the drill which will extend forwardly of the collet in use while leaving the trailing margins on the remainder of the drill, inserting the shank end of the drill through the collet into engagement with a positioning stop and contracting the collet to grip an intermediate portion of the drill directly adjacent its active portion at a plurality of zones including both the leading and trailing margins thereof.

2. The method as defined in claim 1 which comprises periodically making a forward adjustment of the stop, resharpening the drill and thereby reducing its length, and removing the trailing margins from that portion of the drill which to be extended into the active zone.

3. A drill having a forward cutting portion and an intermediate support portion at which the drill is adapted to be gripped circumferentially, the drill being designed for resharpening by removal of stock at its forward end and for use thereafter by shifting the support portion at which it is gripped rearwardly by the amount of stock removed, said drill having continuous flutes extending longitudinally thereof throughout both its cutting and support portions and rearwardly of its support portion, lands extending longitudinally of said drill between each adjacent pair of flutes, the radially outer surface of each of said lands having a continuous substantially cylindrical leading margin which extends for the full length of said land and intersects the surface of the adjacent flute to define a cutting edge which determines a continuous uniform hole size formed by said drill throughout its useful life, the radially outer surface of each of said lands having a substantially cylindrical trailing margin spaced circumferentially from the aforesaid leading margin and of the same radius as the leading margin, which trailing margin is continuous throughout the intermediate support portion of said drill and rearwardly therefrom for the remaining fluted length of said drill, the radially outer land surfaces between said leading and trailing margins being relieved, the leading and trailing margins at the intermediate support portion of said drill providing a multiplicity of circumferentially spaced, substantially cylindrical, concentric support areas double in number to the number of flutes, the trailing margin of each land being omitted forwardly of the intermediate support portion throughout the cutting portion and the entire land area throughout the cutting portion of said drill at the radially outer surface thereof except for the leading margin thereon being relieved to improve the cutting action thereof.

4. A drill as defined in claim 3, said drill being a two-fluted drill in which said flutes extend helically.